United States Patent

[11] 3,578,979

| [72] | Inventors | Toshiji Kawaguchi;<br>Takeo Tanaka, Tokyo-to; Masaru Okada, Kawagoe-shi, Japan |
|---|---|---|
| [21] | Appl. No. | 784,767 |
| [22] | Filed | Dec. 18, 1968 |
| [45] | Patented | May 18, 1971 |
| [73] | Assignee | Kabushiki Kaisha Tajima Seisakusho Tokyo-to, Japan |
| [32] | Priority | Apr. 23, 1968 |
| [33] | | Japan |
| [31] | | 26999/68 |

[54] ELECTRICAL SIGNAL GENERATING APPARATUS HAVING A SCALE GRID
7 Claims, 5 Drawing Figs.

[52] U.S. Cl. .................................................. 250/237,
250/211, 250/234, 356/170
[51] Int. Cl. .................................................. G01b 11/04,
H01j 39/02

[50] Field of Search .......................................... 250/233,
237, 211, 234; 356/169, 170

[56] References Cited
UNITED STATES PATENTS

| 2,788,519 | 4/1957 | Caldwell | 250/237X |
| 3,153,111 | 10/1964 | Barber et al. | 250/237X |
| 3,351,768 | 11/1967 | Cooke | 356/169X |
| 3,371,335 | 2/1968 | Sewald | 356/169X |

*Primary Examiner*—John Kominski
*Assistant Examiner*—E. R. LaRoche
*Attorney*—Waters, Roditi, Schwartz & Nissen

ABSTRACT: When a scale grid undergoes movement relative to index grids superposed on and adhering to respective photoelectric devices, the resulting variation in a bright-dark pattern formed by the grids is detected by the photoelectric devices and converted into electrical signals, which are processed and digitally displayed or utilized for control of machines and equipment.

ELECTRICAL SIGNAL GENERATING APPARATUS HAVING A SCALE GRID

BACKGROUND OF THE INVENTION

This invention relates to optical measuring instruments and apparatuses and more particularly to a new apparatus in which a scale grid and an index grid are caused to move relatively to each other to generate luminance and darkness in a manner such as that of a Moiré pattern, and the pattern is detected by one or more photoelectric elements, and used to indicate digitally the magnitude of movement of the scale grid or used for automatic control of machines and/or processes.

The terms "scale grid" and "index grid" as used herein refer to grids of the following description.

1. A scale grid is a grid comprising alternate white and black stripes inscribed parallelly with equal spacing in the longitudinal direction and in the direction perpendicular thereto on a tape surface or the surface of a bar-shaped structure, the grid being used as a scale.

For angular measurements, a grid with stripes inscribed radially is called a scale grid.

2. An index grid may take the following forms.
   a. A small structure having exactly the same grid pitch or spacing as a corresponding scale grid.
   b. A small structure geometrically similar to the scale grid but having a pitch which is a multiple of that of the scale grid
   c. A combination of four grids (as illustrated by one example in FIG. 5 to be described hereinafter) respectively and successively staggered in phase by P/4.

The above defined scale grid and index grid have the following interrelationship. In the apparatus of the invention, a scale grid is optically magnified and projected, and in the focal plane thereof one or more photoelectric elements are disposed and provided on the light-receiving surface thereof with an index grid pattern formed directly thereon by a method such as printing or photography.

Alternatively, a transparent structure bearing the index grid pattern (for example, a glass plate with the pattern formed thereon by a procedure such as printing, a photographic method, or etching, a photographic film, or a pattern made of a material such as a metal foil) is bonded intimately to the light-receiving surface of each photoelectric element.

Apparatuses of the type in which a scale grid is caused to move interrelatedly with an object to be measured, and the resulting Moiré pattern of luminance and darkness is detected by a photoelectric device to indicate the movement of the scale grid and, therefore, the movement of the object to be measured are known. These known apparatuses have been accompanied by certain difficulties as described in detail hereinafter.

SUMMARY OF THE INVENTION

It is an object of the present invention to overcome these difficulties accompanying the prior art.

More specifically, an object of the invention is to provide an apparatus of the character referred to above which is of simple organization and operates in a simple manner with low light loss, high reading precision, and accurate indication.

A further object of the invention is to provide an apparatus which is highly suitable for application to a wide range of uses, particularly the uses enumerated hereinafter.

According to the present invention, briefly summarized, there is provided, in apparatus of the type referred to above, an organization of parts in which the index grid is superposed in closely adhering state on the light-receiving surface of photoelectric means, and the variations in luminance and darkness created on the surface by the movement of the scale grid are converted into electrical signals corresponding to the magnitude of the movement.

The electrical signals thus derived can be used to cause the movement to be indicated or used to effect automatic control of machines and equipment.

The nature, principle, details, and utility of the invention will be more clearly apparent from the following detailed description including that with respect to a preferred embodiment of the invention when read in conjunction with the accompanying drawings.

DETAILED DESCRIPTION

As conducive to a full understanding of the nature and utility of the present invention, a consideration of known apparatus and the accompanying difficulties is first presented.

Figure 1:
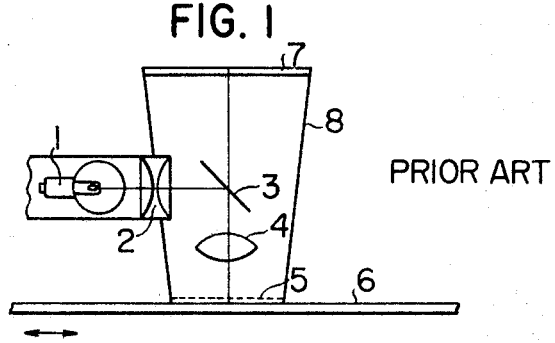
FIG. 1 is a diagrammatic side view showing the essential organization of one example of a known apparatus for measuring the quantity of movement of a scale grid through the use of a Moiré pattern.

Referring first to FIG. 1, the example illustrated therein of a known apparatus for measuring lengths by means of a Moiré pattern comprises, essentially, a light source 1, a condenser lens system 2, a semitransmitting mirror 3 (half-silvered plate) with an inclination of 45° relative to the optical axis from the light source 1 through the condenser lens system 2, an objective lens 4 on the reflection side of the mirror 3, an index grid 5 on the side of the lens 4 opposite the mirror 3, a scale grid 6 disposed parallelly relative to the index grid 5 on the side thereof opposite the lens (below the index grid 5 as viewed in FIG. 1), and a photoelectric element 7 disposed above the mirror 3 on the transmitted light side thereof.

Light emitted from light source 1 is transformed into parallel light rays by condenser lens system 2, which rays are reflected by semitransmitting mirror 3 and, passing through objective lens 4, are projected onto index grid 5. The light which has passed through index grid 5 is projected onto scale grid 6. The light which is reflected by scale grid 6 returns, passing again through index grid 5 and objective lens 4, and, after being transmitted through semitransmitting mirror 3, enters photoelectric element 7 as incident light.

The scale grid 6 and index grid 5 are disposed with a slight inclination relative to each other and are so arranged that when scale grid 6 moves in a interrelated manner with the movement of an object being measured, light luminance and darkness are magnified in the grid line direction and direction perpendicular thereto for each magnitude of movement equal to the grid spacing. This light luminance and darkness are detected by the photoelectric element 7 and converted into an electrical pulse signal. By counting the pulses in this signal, it is possible to determine the distance of travel of the scale grid 6 as a multiple of the grid spacing. In this manner the length of movement of the object being measured can be measured from the dimension of the grid spacing.

In a Moiré pattern-type apparatus of the above description for measurement of magnitude of movement, it is a common practice to house the light source, condenser lens system, semitransmitting mirror, objective lens, index grid, and photoelectric element in a dark box 8 and to expose the index grid 5 to the outside. On one hand, it is necessary to dispose the index grid 5 in close proximity of the scale grid 6. For this reason, there is the possibility of dust and other foreign matter entering the space between these grids to disturb the Moiré pattern, whereby measurement becomes inaccurate, and to cause breakage of or damage to the index grid 5 in the extreme case.

Heretofore, an index grid has been formed by forming a grid on a glass surface or by photoetching a metal plate. The procedures for these methods, however, are extremely difficult. In order to separate the scale and index grids, a Moiré pattern-type apparatus for measuring movements in which the image of the scale grid is formed on the index grid to establish a Moiré pattern, the image of which is further projected onto and formed on a photoelectric element, has been proposed.

An apparatus of such a character, however, involves a large number of optical systems whereby the organization tends to become complicated, and, at the same time, the loss of light quantity is high since the image of the Moiré pattern is projected by way of an optical system onto the photoelectric element. Moreover, the image thus projected lacks definition, whereby the reading accuracy is lowered, and indication becomes inaccurate.

The above described difficulties accompanying the prior art have been overcome by the present invention according to which there is provided an apparatus of the instant class of simple organization and low light loss which has high reading accuracy and is therefore capable of accomplishing accurate indication.

Figure 2:
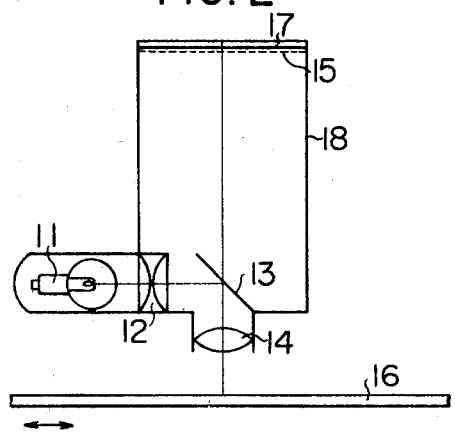
FIG. 2 is a diagrammatic side view showing the essential organization of one example of an apparatus according to the invention.

In a preferred embodiment of the invention as illustrated in FIG. 2, there are provided a light source 11, a condenser lens system 12, a semitransmitting mirror 13, and an objective lens 14 as in the known apparatus shown in FIG. 1. The apparatus of the invention differs in that, while a scale grid 16 is placed below the objective lens 14 (as viewed in FIG. 2), an index grid 15 is disposed not immediately above the scale grid 16 but immediately below the incident surface of photoelectric element 17 disposed on the transmitted light side (upper side) of the mirror 13. The index grid 15 is formed on the light-receiving surface of the photoelectric element 17 by a method such as printing.

Light rays from light source 11 are condensed by condenser lens system 12, deflected through 90° of angle by the half-silvered mirror 13, and, after passing through objective lens 14, projected onto scale grid 16, being partly reflected therefrom. The light which has thus been reflected passes through the former light path in reverse direction and, passing through objective lens 14, is transmitted through half-silvered mirror 13 to be projected onto photoelectric element 17. Thus, the image of scale grid 16 is projected onto index grid 15 thereby to generate a pattern of luminance and darkness.

According to the present invention, the index grid 15 is formed, for example, by direct printing on the flat light incident surface of the photoelectric element 17 consisting essentially of a silicon solar battery, for example, or direct bonding on the light incident surface of a photographic film on which the index grid has been projected and photographed. Alternatively, the index grid 15 can be formed by another photographic method.

Figure 3:
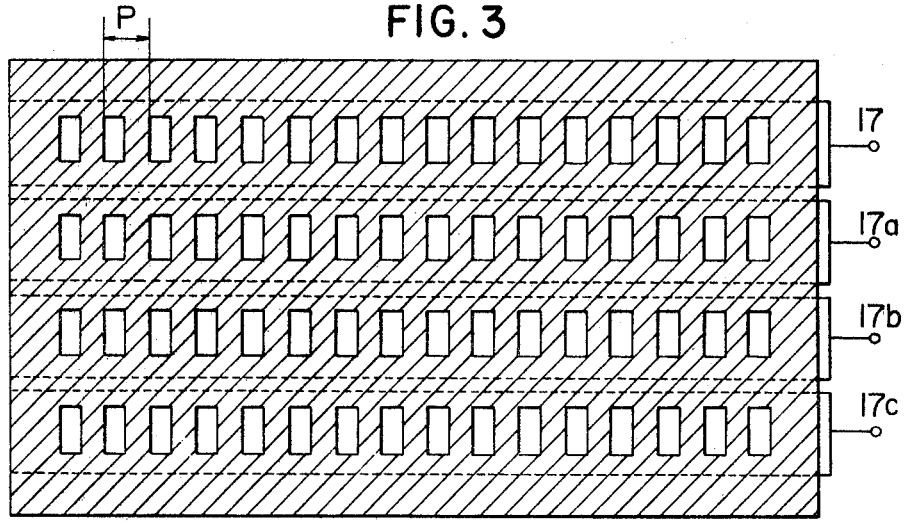
FIG. 3 is a planar view showing an index grid pattern formed by a process such as printing on the light-receiving surfaces of photoelectric elements in accordance with the invention.

One example of a pattern of an index grid printed on the light incident surface of a photoelectric element 17 is illustrated in FIG. 3. In this pattern, the grid is divided into four parts by masks, and the grid spacing is P. Thus, four sets of index grids are formed and are detected by photoelectric elements 17, 17a, 17b, and 17c, respectively, whereby four electrical signals are obtained. By using these four signals, it is possible to measure the direction and distance of travel of the scale grid.

A feature of the example illustrated in FIG. 2 of apparatus according to the invention is that the index grid 15 is formed in intimate contact with the light-receiving surface of the photoelectric element 17 and is housed within a dark box 18 together with the light source 11, condenser lens system 12, half-silvered mirror 13, and objective lens 14. Accordingly, there is little possibility of damage due to outside forces.

Another feature of this apparatus is that since the image of scale grid 16 is caused to be formed on index grid 15 through the use of objective lens 14, the size of this image can be freely varied. Accordingly, it is possible to select a suitable magnification with consideration of factors such as ease of operation and facility in fabrication.

Still another feature of this apparatus is that since the index grid 15 is printed on the light-receiving surface of the photoelectric element 17, whereby a Moiré pattern can be formed thereon, and this Moiré pattern is observed directly by the photoelectric element 17, there is no necessity for an optical system for projecting an image of the Moiré pattern. Therefore, the apparatus organization can be made simple, and loss of light is very low, whereby a Moiré pattern of high definition can be produced. Accordingly, high reading precision and accurate indication can be attained.

Figure 4:
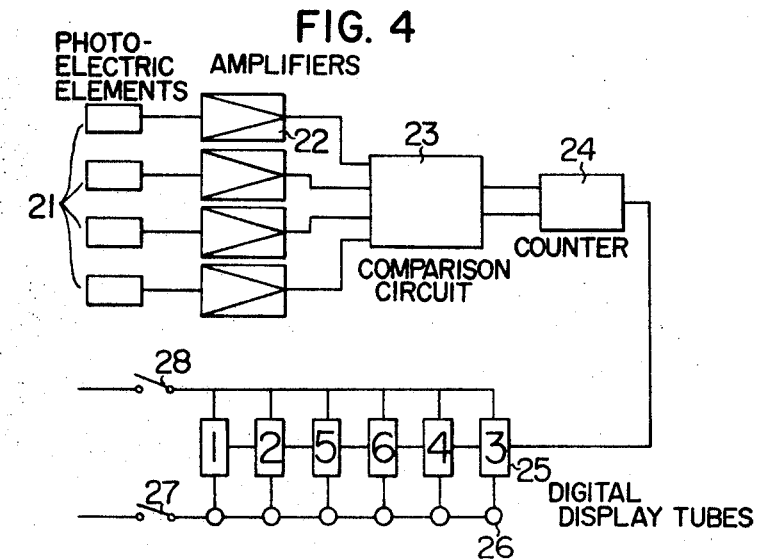
FIG. 4 is a block circuit diagram indicating the essential organization of one example of a counter circuit for processing signal supplied from the photoelectric element and digitally indicating the movement of a scale grid.

One example of a circuit for processing signals supplied from photoelectric elements and digitally indicating the magnitude of movement of the object being measured is illustrated in FIG. 4. In this circuit, there are provided four photoelectric elements 21, amplifiers 22 connected in series respectively thereto, a comparison circuit 23 receiving the outputs of the amplifiers 22, a reversible counter 24 connected to the output side of the circuit 23, and digital display tubes 25 connected to receive the outputs of the counter 24. The display tubes 25 on one side thereof are provided with respective preset switches 26 connected in series to each other and to a preset pushbutton 27 and on the other side thereof to a common zero-set pushbutton 28.

The circuit of the above described organization according to the invention operates in the following manner. Signals supplied from photoelectric elements 21 are amplified by amplifiers 22 and then compared in comparison circuit 23, where counting directions are discriminated. Then, in accordance with these directions thus discriminated, counting is carried out in reversible counter 24, the values thus counted being indicated by the digital display tubes 25.

More specifically, when amplifiers 22 receive signals generated by photoelectric elements 21 and, after amplifying these signals, send them to comparison circuit 23, comparison circuit 23 discriminates the direction of travel of the scale grid in accordance with the waveforms of the signals and sends command signals for addition or subtraction to reversible counter 24. Reversible counter 24 operates in response to the command signals of comparison circuit 23 to carry out addition or subtraction of the number of input signals.

Digital display tubes 25 indicate by emitting light the digits corresponding to the signals from reversible counter 24. Preset switches 26 indicate digits by means of switches such as rotary switches and, when pushbutton 27 is pushed, send command signals to reversible counter 24, thereby causing digits to be displayed by digit display tubes 25.

Figure 5:
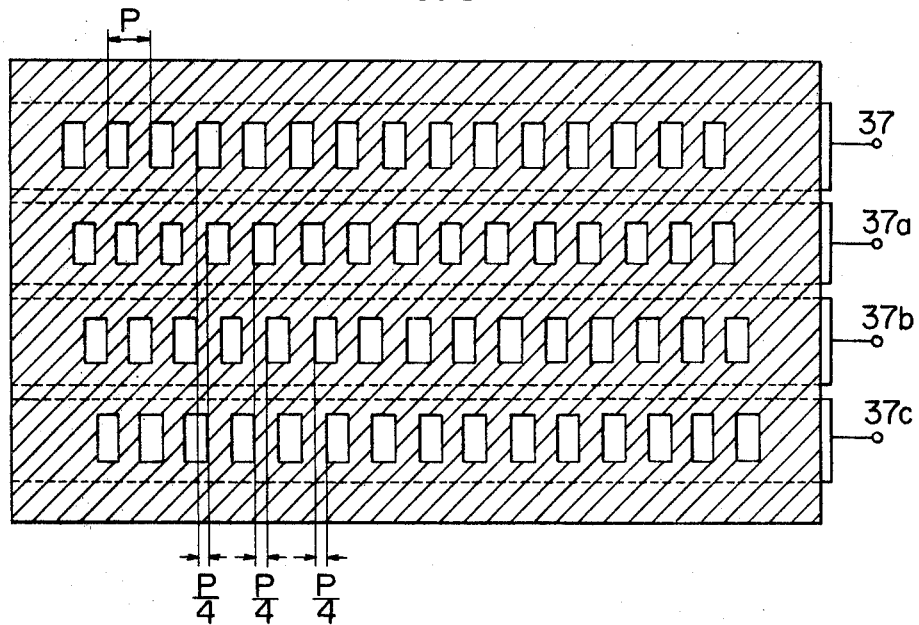
FIG. 5 is a planar view similar to FIG. 3 showing another example of an index grid pattern according to the invention.

The present invention is not limited to its application to only a measuring instrument in which a Moiré pattern is utilized. It is also possible to apply the invention generally to an apparatus whereby movement quantities can be measured by causing a scale grid disposed parallelly relative to an index grid to move thereby to generate luminance and darkness and detecting this luminance and darkness by means of photoelectric elements. In this case, also, an index grid is formed on the light-receiving surface of the photoelectric elements by a method such as printing. One example of the pattern of such an index grid is illustrated in FIG. 5. In this grid, a grid spacing (or pitch) P is selected. The grid is divided into four parts by masking, and the grid rows are successively staggered or lagged by P/4.

The present invention, as described above, provides an apparatus wherein a scale grid and an index grid are caused to move relative to each other to produce luminance and darkness, which are converted into electrical signals by photoelectric elements. In order to indicate fully the principle of the invention, the case in which in an apparatus of this character, use is made of an index grid of the geometric pattern shown in FIG. 5 will now be considered.

It will first be assumed that a projected image of white (image of luminous parts) and black (image of dark parts) of the scale grid is formed at the stripes of white (transparent parts) and black (concealed parts) of the uppermost row (first row), whereby superposition of white on white and black on black occurs, whereupon one-half of the total area of the first-row photoelectric element receives light (maximum light quantity).

At this time, the area of the second-row grid which transmits light is one-half of that of the first row since the second row grid is staggered or lags in phase by P/4 relative to the first row. Consequently, one-fourth of the total area of the photoelectric element receives light.

At this time, since the third-row grid is further staggered by P/4 relative to the second row, white and black are superposed, whereby absolutely no light is transmitted.

As this time, furthermore, the fourth-row grid passes light in only one-half thereof in the direction opposite to that of the second-row grid. Accordingly, the quantity of light received by the corresponding photoelectric element is the same as that of the second row.

When the relative position of the scale grid and the index grid shifts by P/4 from that described above, the second or fourth row receives the maximum or minimum light, and the light quantities received by the first and third rows are intermediate. Then, when a further shift of relative position of P/4 occurs, the result of the first shift is reversed; that is, the first-row light reception becomes minimum, and the third-row light reception becomes maximum.

Thus, as the relative position of the grids shifts successively in this manner by increments each of P/4, the region receiving a constant quantity of light moves from an upper row to a lower row or from a lower row to an upper row. Since the electromotive force generated by a photoelectric element is proportional to the quantity of light received, electromotive forces corresponding to the light quantities received can be obtained.

It is apparent from the above described principle that if the scale grid is made with a grid spacing, or pitch, P of 4 microns or 40 microns, for example, and an index grid, for example, of a pattern as shown in FIG. 5 is used, there will be a region of maximum electromotive force of the photoelectric elements corresponding to each one-fourth division of the pitch of the scale grid. Accordingly, this maximum electromotive force can be carried out and utilized as an electric signal.

Therefore, by using a scale grid of the above described pitch of 4 microns, an electrical signal corresponding to each 1 micron can be obtained. Similarly, by using a scale grid of a 40-micron pitch, an electrical signal can be obtained for every 10 microns.

The apparatus of the present invention as described above and in various modifications thereof is applicable to a wide range of uses, principal examples of which are as follows:

1. The apparatus as described above operates to generate electrical signals through the use of a scale grid and, passing these signals through circuits such as amplifiers, a comparison circuit, and a counter, to cause quantitative variations in the relative position of the scale grid and index grid to be indicated by digital display tubes.

Thus, the apparatus can be utilized to indicate digitally the quantity of movement of a machine part as, for example, a table or spindle head of a machine tool, of a measuring member of a measurement instrument (filler, anvil, spindle, etc.) or of carriages and the like.

2. The output of the output terminals of the apparatus can be utilized to effect automatic positioning relating to program control of machines and equipment. For this purpose, the following two methods can be used.

a. Open-loop utilization

The output is transformed into pulses, which are used to operate a pulse motor, automatically starting and stopping the motor to accomplish the required positioning.

b. Closed-loop Utilization

In accordance with a program, preset signals are imparted to a counter circuit to preset movement distances and thereby to start automatically a motor, control being carried out as the quantity of movement is measured by the counter circuit, and as the movement distance is verified by feedback to the motor.

We claim:

1. In apparatus of the type wherein a scale grid is caused to undergo movement relative to an index grid thereby to create a luminance-and-darkness pattern, and said pattern is converted into electrical signals by photoelectric means having at least one light-receiving surface thereby to detect the magnitude of said movement of said scale grid, an organization of parts in which said index grid is superposed in closely adhering state on said light-receiving surface, whereby variations in luminance and darkness created on said surface by the movement of the scale grid are converted into electrical signals corresponding to the magnitude of said movement.

2. An organization of parts as claimed in claim 1 in which the index grid is printed on the light-receiving surface of the photoelectric means.

3. An organization of parts as claimed in claim 1 in which the index grid is borne on a photographic film bonded to the light-receiving surface of the photoelectric means.

4. An organization of parts as claimed in claim 1 in which the index grid is directly photoprinted to the light-receiving surface of the photoelectric means.

5. An organization of parts as claimed in claim 1, in which the output sides of the photoelectric elements are connected to a signal processing circuit comprising amplifiers for amplifying the outputs of corresponding photoelectric elements, a comparison circuit for comparing the outputs of said amplifiers, discriminating the direction of movement of the scale grid, and thereby generating corresponding command signals, and a reversible counter for operating in response to said command signals to carry out the command operation of the number of input signals and thereby to generate electrical signals.

6. An organization of parts as claimed in claim 1, in which the index grid has a plural number $n$ of rows of black and white stripes with a constant grid pitch P, said rows being superposed on the light-receiving surfaces of respectively corresponding photoelectric elements.

7. An organization of parts as claimed in claim 6 in which the $n$ rows are successively staggered in pitch phase by increments of $P/n$.